F. R. C. & E. F. JOYCE.
SPEED MEASURE.
APPLICATION FILED JAN. 16, 1907.
997,297.
Patented July 11, 1911.
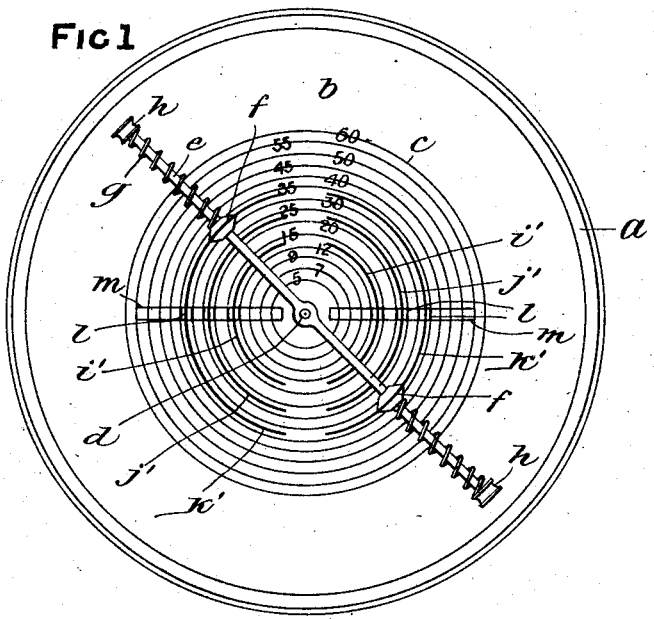
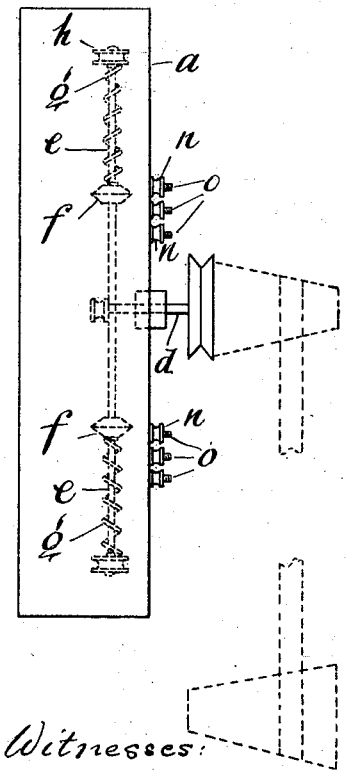
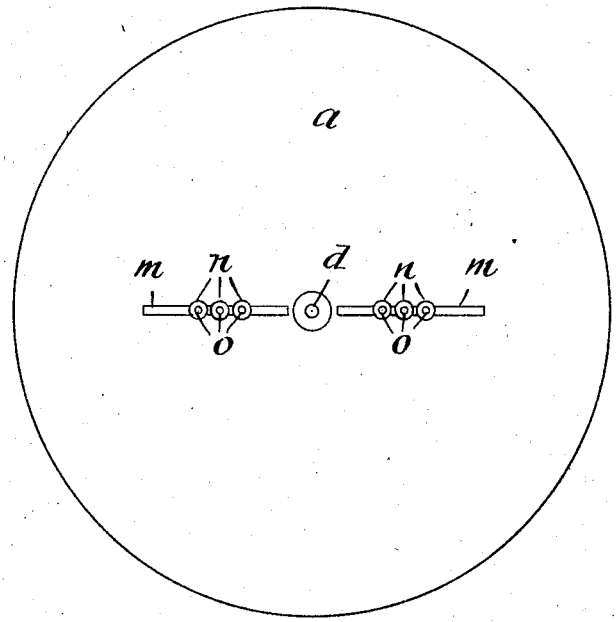

UNITED STATES PATENT OFFICE.

FREDERICK RICHARD CHURCH JOYCE AND ERNEST FREDERICK JOYCE, OF FARNBOROUGH, ENGLAND.

SPEED-MEASURE.

997,297.  Specification of Letters Patent.  Patented July 11, 1911.

Application filed January 16, 1907. Serial No. 352,498.

*To all whom it may concern:*

Be it known that we, FREDERICK RICHARD CHURCH JOYCE and ERNEST FREDERICK JOYCE, subjects of His Majesty the King of Great Britain, and residents of Oak Lawn, The Park, Farnborough, in Hampshire, England, engineers, have invented certain new and useful Improvements in Speed-Measures, of which the following is a specification.

This invention relates to speed measures for automobiles and the like whereby not only may the speed be made known but also the moment at which the gear can be most advantageously changed from one speed to another.

The invention also has in view to provide a construction which shall comprise few working parts and embody simplicity of construction and design with a maximum effectiveness in use.

In order that the invention and the manner of carrying the same into effect may be clearly and readily understood reference is hereinafter made to the accompanying drawings in which:—

Figures 1 and 2 are respectively front and back views of a speed measure according to this invention. Fig. 3 is a side view of a speed measure arranged as in Figs. 1 and 2.

In carrying our invention into effect, we construct of any suitable material a preferably circular, but which as hereinafter referred to, may be other shaped casing $a$ provided with a dial $b$ on which are set out a number of indicating circles or marks $c$, each intended to correspond with a certain speed as will be hereinafter made clear. In the casing $a$ is freely mounted a spindle $d$ and upon the inner end of such spindle is fixed centrally of its length a rod $e$ and near each end of said rod $e$ is loosely located a disk $f$ and spiral spring $g$ which are kept in place as by conveniently shaped screw-nuts $h$. In order to provide means for accurately defining the positions of the disks relatively to the indicating circles, a sharp edge is provided on the disks which may be centrally arranged as shown. By suitably connecting up the spindle $d$ to some convenient moving part of an automobile or the like the rod $e$ will, on the engine being started, be rotated, and such revolution of the rod $e$ will cause the loosely mounted disks $f$ to move outward against the force of the springs $g$ owing to the action of centrifugal force and, according to the particular indicating circle coinciding with the circular path traced by such disks $f$, the speed may be quickly and easily read, as such indicating circles are suitably marked for this purpose and the disks $f$ would, as the speed reduces be pressed inwardly by the springs $g$. In order however that the person driving an automobile or the like may know the most advantageous moment to change from one gear ratio to another, two or more distinctive indicators are provided at distances from the center of the dial and from each other suitable for the particular kind of variable gear employed *i. e.*, so that each indicator will respectively indicate that speed of the car at which the gear thereof may be most advantageously changed from one speed to another.

Obviously any suitable mode of easily distinguishing the change speed circles may be adopted, for example by providing movable pairs of curved strips such as $i^1$, $j^1$ and $k^1$ Fig. 1, so that one form of gage may, by adjusting such strips, be applicable to different types of change speed gears. As shown by Figs. 1 to 3, the said strips are fixed to slides $l$ working in slots $m$ and set by tightening the nuts $n$ on the slide screws $o$, whereby, according to the different speeds of the variable gear with which the indicator is to be employed, the pairs of strips $i^1$ $j^1$ and $k^1$ may be spaced the requisite distance from each other and from the center of the dial and then fixed by screwing up the nuts $n$.

Although a speed measure according to our invention has been described as having a circular casing and a circular dial the invention is not limited thereto and the details of the centrifugal device may be varied without departing from the spirit of the invention.

Having thus described our invention what we claim and desire to secure by patent is:—

1. In a speed measure the combination of a casing, a driving spindle rotatably mounted in said casing, a dial within said casing having a series of divisional speed marks struck from the center of said spindle, a series of indicators distinctive from each other and from said divisional speed marks, adapted to be adjusted radially with respect to said divisional speed marks, means for holding said indicators in adjustment, a member caused to gyrate by the rotation of said spindle, an indicating member adapted to move away from the center of said spindle in proportion to centrifugal forces set up by said gyrating member, and means for returning said indicating member to zero position.

2. In a speed measure the combination of a casing, a driving spindle rotatably mounted in said casing, a dial within said casing having a series of divisional speed marks struck from the center of said spindle, a series of indicators distinctive from each other and from said divisional speed marks and adapted to be independently adjusted radially with respect to said divisional speed marks, means for independently holding each of said indicators in adjustment, a member caused to gyrate by the rotation of said spindle, an indicating member adapted to move away from the center of said spindle in proportion to centrifugal forces set up by said gyrating member, and means for returning said indicating member to zero position.

3. In a speed measure the combination of a casing, a driving spindle rotatably mounted in said casing, a dial within said casing having a series of divisional speed marks struck from the center of said spindle, a series of indicators distinctive from each other and from said divisional speed marks, adapted to be adjusted radially with respect to said divisional speed marks, means for holding said indicators in adjustment, two oppositely arranged radial arms fixed to said spindle, a weighted member slidable on each of said arms, a spring device on each of said arms adapted to oppose the outward movements of said weighted members due to centrifugal forces set up by the gyartion of said arms, and means on said weighted members for defining their positions relatively to said divisional speed marks.

4. In a speed measure the combination of a casing, a driving spindle rotatably mounted in said casing, a dial within said casing having a series of divisional speed marks struck from the center of said spindle, a series of indicators distinctive from each other and from said divisional speed marks, and adapted to be independently adjusted radially with respect to said divisional speed marks, means for independently holding each of said indicators in adjustment, two oppositely arranged radial arms fixed to said spindle, a weighted member slidable on each of said arms, a spring device on each of said arms adapted to oppose the outward movements of said weighted members due to centrifugal forces set up by the gyration of said arms, and means on said weighted members for defining their positions relatively to said divisional speed marks.

In witness whereof we have hereunto set our hands in presence of two witnesses.

FREDERICK RICHARD CHURCH JOYCE.
ERNEST FREDERICK JOYCE.

Witnesses:
HENRY CONRAD HEIDE,
ALBERT GEORGE BARNES.

---

Copies of this patent may be obtained for five cents each, by addressing the "Commissioner of Patents, Washington, D. C."